(12) United States Patent
Porter et al.

(10) Patent No.: US 6,948,782 B2
(45) Date of Patent: Sep. 27, 2005

(54) WHEEL HUB ASSEMBLIES WITH ANTI-ROTATE FEATURE FOR USE WITH ZERO-RADIUS-TURNING VEHICLE

(75) Inventors: Steven R. Porter, Burnsville, MN (US); Todd A. Porter, Rosemount, MN (US); Dale A. Stover, Plymouth, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/442,400

(22) Filed: May 21, 2003

(65) Prior Publication Data

US 2004/0232760 A1 Nov. 25, 2004

(51) Int. Cl.$^7$ ................................................ F16B 39/10
(52) U.S. Cl. ................................ 301/105.1; 301/35.63; 301/111.03; 411/120
(58) Field of Search ............................ 301/35.55, 35.57, 301/35.63, 35.621, 35.622, 35.623, 35.624, 111.01, 111.02, 111.03, 113, 114, 115; 411/119, 120

(56) References Cited

U.S. PATENT DOCUMENTS

| | | | | |
|---|---|---|---|---|
| 1,088,515 A | * | 2/1914 | Bazin | 411/120 |
| 1,316,948 A | * | 9/1919 | Bodine | 451/439 |
| 1,464,922 A | * | 8/1923 | Close | 295/44 |
| 1,777,291 A | * | 10/1930 | Clayton | 174/63 |
| 2,202,080 A | * | 5/1940 | Baker | 152/48 |
| 2,232,859 A | * | 2/1941 | Limprecht | 301/35.63 |
| 2,271,849 A | * | 2/1942 | Wallace | 301/126 |
| 2,890,910 A | * | 6/1959 | Bern | 301/35.63 |
| 4,004,838 A | | 1/1977 | Savage | |
| 4,735,533 A | * | 4/1988 | Gallagher et al. | 411/119 |
| 5,100,247 A | * | 3/1992 | Woehler | 384/544 |
| 5,297,693 A | * | 3/1994 | Perkey | 220/328 |
| 5,544,545 A | | 8/1996 | Sanders et al. | |
| 6,467,853 B1 | | 10/2002 | Swartzendruber et al. | |
| 6,789,445 B1 | | 9/2004 | Todd et al. | |

OTHER PUBLICATIONS

"Wheel Horse® 522xi Garden Tractor," Toro® Parts Catalog, 2002, Model No. 73561–230000001 and Up; Form No. 3328–746.

"Wheel Horse® 17–44 Lawn Tractor," Toro® Parts Catalog, 2000, Model No. 77106–200000001 and Up; Form No. 3324–349.

* cited by examiner

*Primary Examiner*—Russell D. Stormer
(74) *Attorney, Agent, or Firm*—Mueting, Raasch & Gebhardt, P.A.

(57) ABSTRACT

The present invention provides a hub assembly and a hub fastener anti-rotate apparatus for securing a wheel of vehicle (e.g., a zero-radius-turning lawn mower) to a vehicle drive axle. The anti-rotate apparatus may assist in preventing or substantially limiting loosening of a hub fastener used to secure the hub assembly to the drive axle.

9 Claims, 8 Drawing Sheets

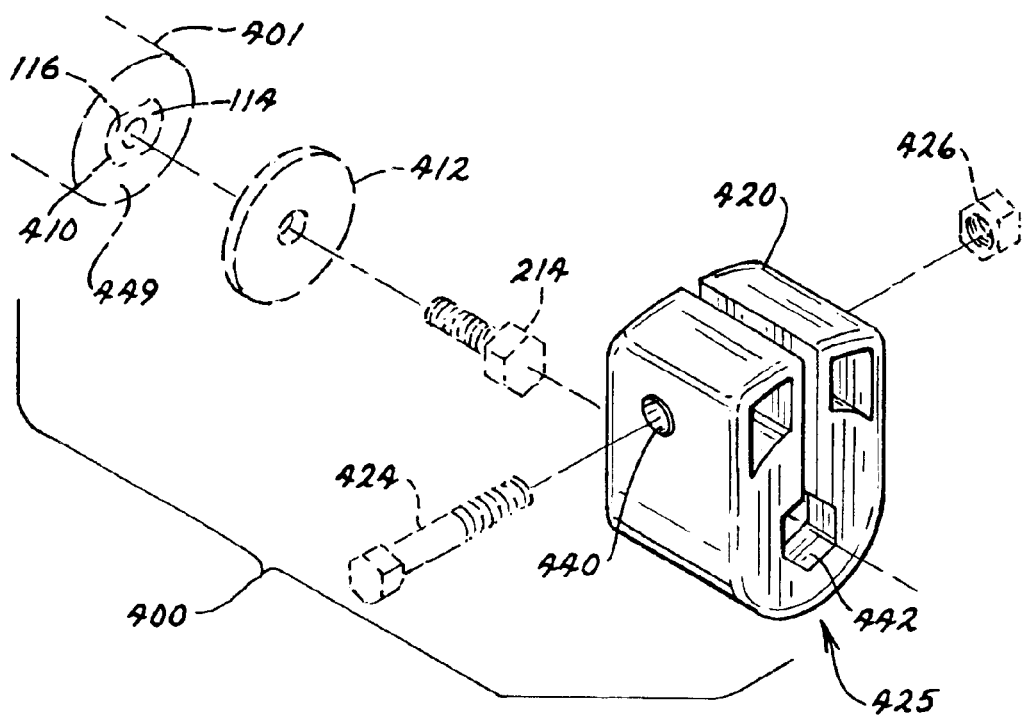
FIG. 13
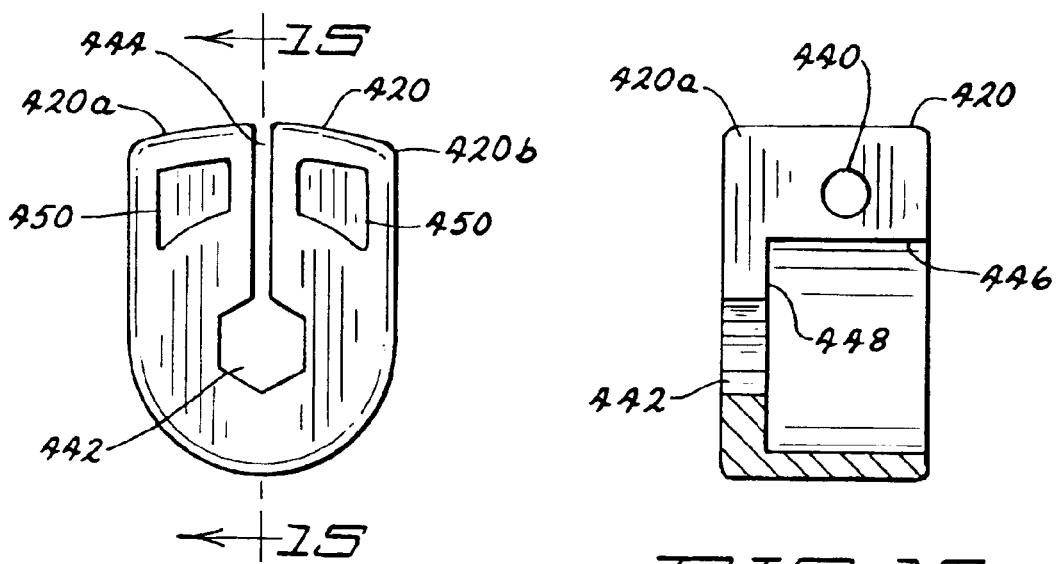
FIG. 14
FIG. 15

WHEEL HUB ASSEMBLIES WITH ANTI-ROTATE FEATURE FOR USE WITH ZERO-RADIUS-TURNING VEHICLE

TECHNICAL FIELD

The present invention relates generally to a zero-radius-turning (ZRT) ground maintenance vehicle such as a ZRT riding mower and, more particularly, to wheel hub assemblies having anti-rotate features for use with such a vehicle.

BACKGROUND

Traditional riding mowers, e.g., those typically having four wheels wherein the front wheels are conventionally steerable, are in common use by homeowners and professionals alike. However, for lawns having numerous obstacles, tight spaces, and/or intricate borders, riding mowers having zero-radius-turning (ZRT) capability are often preferred. As the name implies, "ZRT" generally indicates a vehicle having a very tight minimum turning radius, i.e., a vehicle that is highly maneuverable.

Most ZRT riding mowers have one or more drive wheels located on each side of the mower. The drive wheels are independently powered, e.g., by hydraulic motors or integrated zero-turn transaxles, so that, while a drive wheel on a first side of the mower may rotate in a first direction at a first speed, the drive wheel on the opposite side may rotate in the same or different direction at the same or different speed. Rotating one drive wheel for forward motion while simultaneously slowing, stopping, or reversing rotation of the drive wheel on the opposite side, causes the mower to turn. At the extreme, the mower may spin generally about a vertical axis located between the respective drive wheels.

Each drive wheel is typically coupled to a drive shaft or axle of a mower with a hub. The hub may include a flange having a conventional lug pattern to which the wheel attaches.

Often, the hub is attached to the drive axle with a coaxial fastener or mounting bolt and transfers rotational power through mating surfaces provided on both the axle and the hub. While this configuration is adequate for many applications, the frequent speed and direction changes common with ZRT mowers may cause the coaxial bolt to back out or loosen over time. This problem may be more apparent where the configuration of the hub and axle mating surfaces allows for greater rotational movement of the hub relative to the axle.

As a result, many ZRT mowers that utilize a central mounting bolt also utilize a hub/axle combination having relatively tight clearances, i.e., having minimal backlash or "looseness," between the mating surfaces of the drive axle and the hub. Thus, relative motion between the axle and the hub is minimized, reducing the tendency for the mounting bolt to inadvertently loosen over time. Some configurations that provide such tight clearances include, for example, an axle and hub using a key and keyway to transfer torque. Other configurations may utilize a tapered axle and hub combination, where the axle transfers torque to the hub via the interference fit between the two components. Other options include permanently securing the hub to the axle, such as by welding. All these configurations provide minimal backlash and, thus, may be effective in limiting the loosening effect on the mounting bolt during mower operation.

While effective at reducing backlash, these hub and axle configurations are potentially expensive to produce. Although the cost may be acceptable for larger, commercial grade equipment, it may be economically undesirable for smaller mowers, e.g., those directed primarily to homeowners. Moreover, smaller ZRT mowers may not have a drive axle of sufficient diameter to accommodate the desired keyway or taper configuration.

Another technique known for preventing loosening between two components is lockwiring. While effective, lockwiring can be labor-intensive and require a certain level of skill to properly install. In addition, lockwire is usually destroyed upon removal, i.e., it is generally not reusable.

SUMMARY

The present invention provides wheel hub assemblies and anti-rotate apparatus for use with ZRT vehicles that overcome the above-identified problems. In particular, the present invention provides hub assemblies attachable to a drive axle with a coaxial hub fastener. Each hub assembly includes an anti-rotate apparatus that substantially restricts or eliminates relative motion between the hub fastener and a hub portion of the hub assembly.

In one embodiment, a wheel hub assembly for attachment to a drive axle of a zero-radius-turning mower is provided. The hub assembly includes a hub having a central opening with one or more drive axle receiving surfaces, and a hub fastener operable to axially secure the hub to the drive axle. An anti-rotate apparatus having at least one threaded retaining fastener is also included. The anti-rotate apparatus substantially restricts or prevents rotation of the hub fastener relative to the hub when the hub is attached to the drive axle.

In another embodiment, a wheel hub assembly for coupling a wheel to a drive axle of a zero-radius-turning vehicle is provided. The hub assembly includes a hub having a central opening with a drive axle receiving surface, and a hub fastener coaxial with an axis of the drive axle. The hub fastener is operable to axially retain the hub relative to the drive axle. An anti-rotate apparatus including an anti-rotate member and at least one threaded retaining fastener is also included. The anti-rotate apparatus is operable to substantially limit or prevent relative rotation between the hub fastener and the hub when the hub is attached to the drive axle.

In yet another embodiment, an anti-rotate apparatus operable to prevent loosening of a hub fastener used to secure a wheel hub to a drive axle of a zero-radius-turning vehicle is provided. The anti-rotate apparatus includes a hub fastener anti-rotate member; and a threaded retaining fastener operable to secure the anti-rotate member relative to the hub.

In still yet another embodiment, an anti-rotate apparatus operable to prevent loosening of a hub fastener used to secure a wheel hub to a drive axle of a zero-radius-turning vehicle is provided. The anti-rotate apparatus includes means for engaging the hub fastener, and a threaded retaining fastener operable to secure the means for engaging the hub fastener relative to the hub.

The above summary is not intended to describe each embodiment or every implementation of the present invention. Rather, a more complete understanding of the invention will become apparent and appreciated by reference to the following detailed description and claims in view of the accompanying drawing.

BRIEF DESCRIPTION OF THE VIEWS OF THE DRAWING

The present invention will be further described with reference to the views of the drawing, wherein:

FIG. 13 is a partial exploded view of a wheel hub assembly and associated anti-rotate apparatus in accordance with yet another embodiment of the present invention;

FIG. 14 is an enlarged view of an anti-rotate member, e.g., clamp, of the anti-rotate apparatus of FIG. 13; and FIG. 15 is a section view of the anti-rotate member of FIG. 14 taken along line 15—15.

DETAILED DESCRIPTION OF EXEMPLARY EMBODIMENTS

Figure 1:
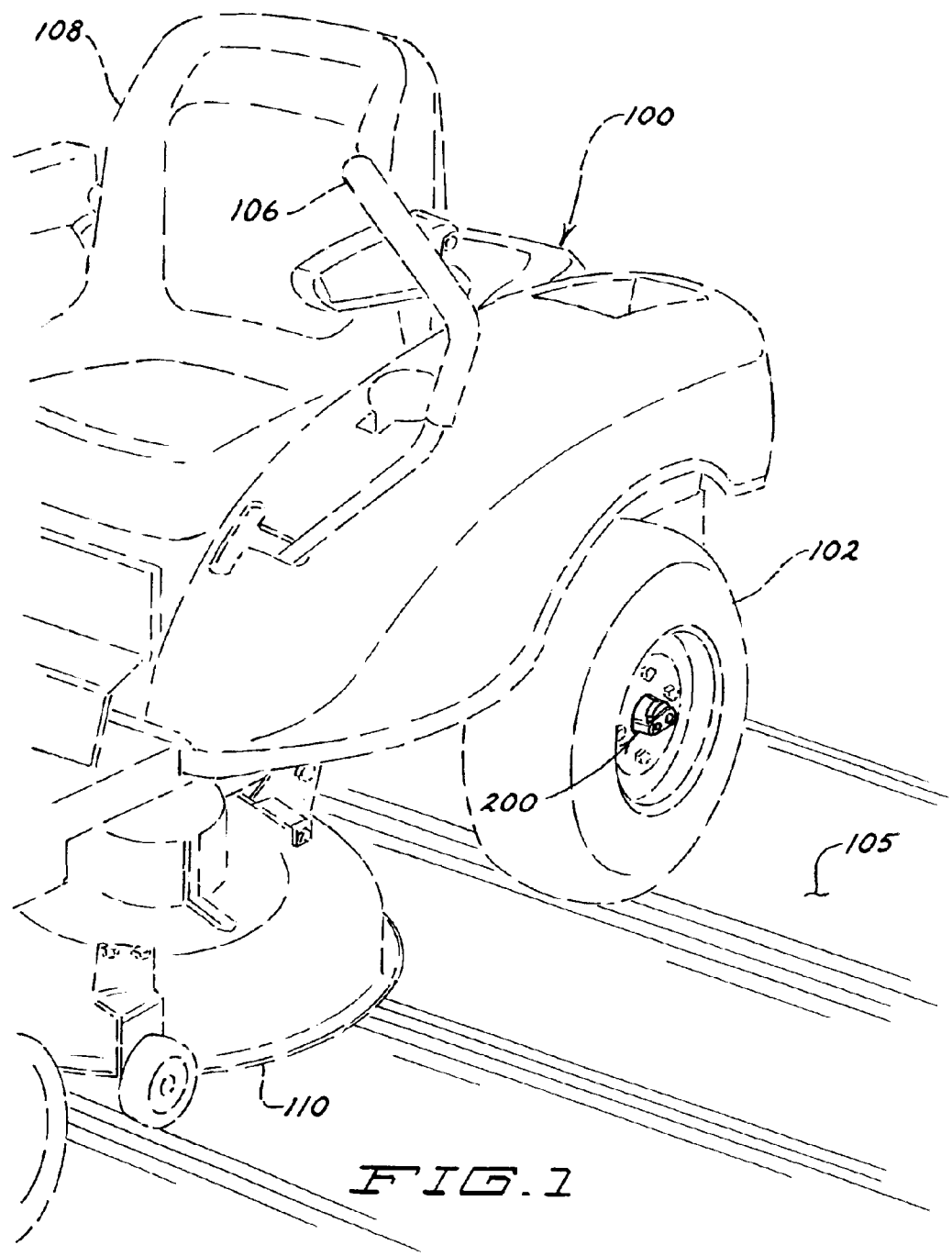
FIG. 1 is a perspective view of a portion of a zero-radius-turning (ZRT) vehicle, e.g., a mower, having a wheel and wheel hub assembly in accordance with one embodiment of the present invention.

In the following detailed description of exemplary embodiments, reference is made to the accompanying views of the drawing which form a part hereof, and in which are shown by way of illustration specific embodiments in which the invention may be practiced. It is to be understood that other embodiments may be utilized and structural changes may be made without departing from the scope of the present invention.

Generally speaking, the invention described herein is directed to a wheel hub assembly advantageous for use with a zero-radius-turning (ZRT) riding mower. The hub assembly includes a hub that may secure to an end of a powered drive axle with a coaxial hub fastener, e.g., bolt. To prevent loosening of the hub fastener, hub assemblies of the present invention may include an anti-rotate apparatus which substantially restricts or eliminates relative motion between the hub fastener and the hub. As a result, the hub fastener preferably does not loosen when the hub assembly is subjected to the numerous speed changes and directional reversals often associated with operation of ZRT vehicles.

FIG. 1 illustrates a hub assembly 200 in accordance with one embodiment of the present invention as it may be incorporated on an exemplary self-propelled, ground maintenance vehicle, e.g., a ZRT riding lawn mower 100 (also referred to herein simply as a "mower"). While the invention is herein described with respect to riding ZRT mowers, those of skill in the art will realize that the invention is also applicable to other mowers (e.g., walk-behind), and to other vehicles, especially those having ZRT capability, such as skid-steer loaders and other construction or excavation vehicles.

While the present invention is not limited to any particular mower configuration, an exemplary ZRT mower that may incorporate the wheel hub assembly of the present invention is briefly described below.

A left and a right ground-engaging drive wheel 102 (only left wheel shown in FIG. 1) may be rotatably coupled to left and right sides of the mower 100, respectively. The drive wheels 102 may be independently powered by an engine (not shown), e.g., via one or more hydraulic motors, transmissions, transaxles, or the equivalent, so that the drive wheels 102 may propel the mower 100 along a ground surface 105 during operation. A pair of front swiveling caster wheels (not shown) may support a front portion of the mower 100 in rolling engagement with the ground surface 105.

One or more controls, e.g., left and right drive control levers 106 (left lever shown in FIG. 1 displaced outwardly for operator ingress/egress) are also provided. The drive control levers 106 are generally pivotally coupled to a frame of the mower 100, e.g., such that they may pivot forwardly and rearwardly under the control of an operator sitting in an operator's seat 108. Each drive control lever 106 is operable to independently control speed and direction of the respective drive wheel 102 via manipulation of the mower's drive system as is known in the art. For example, incremental forward movement (e.g., pivoting about a transverse horizontal axis) of the left (or right) drive control lever 106, from a neutral position, results in an incremental increase in rotational speed of the left (or right) drive wheel 102 in a forward direction. Similarly, incremental rearward movement of the left (or right) drive control lever 106, from a neutral position, results in an incremental increase in rotational speed of the left (or right) drive wheel 102 in a rearward direction.

A cutting deck 110 may be mounted to a lower side of the mower 100. The cutting deck 110 includes one or more cutting blades (not shown), as known in the art, that are operatively powered by the engine. Miscellaneous controls (also not shown) may be provided to allow operator control of various mower functions, e.g., throttle, blade engagement, cutting deck height, etc. During operation, power is selectively delivered to the cutting deck 110 and the drive wheels 102, whereby the cutting blades rotate at a speed sufficient to sever grass and other vegetation as the cutting deck 110 passes over the ground surface 105.

Figure 2:
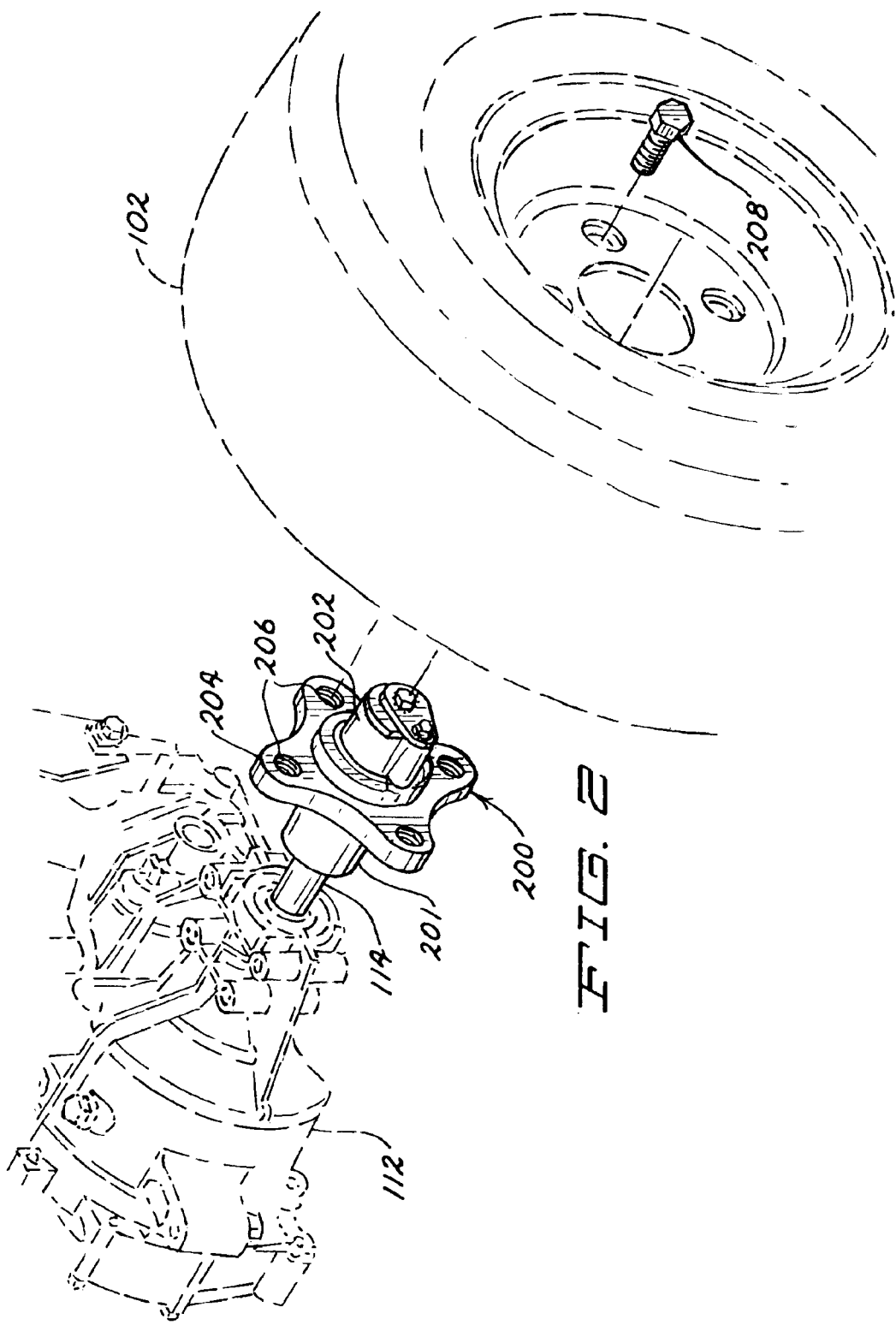
FIG. 2 is an enlarged view of the wheel hub assembly of FIG. 1 with the wheel detached.

FIG. 2 is an enlarged partial view of the mower 100 showing the wheel hub assembly 200 (wheel 102 removed for clarity). As is known in the art, a wheel motor 112, e.g., hydraulic motor, having a drive axle 114 may be provided to deliver rotational power to the wheel 102. The hub assembly 200 may be coupled to a distal end 116 (see FIG. 3) of the axle 114 as further described below.

The hub assembly 200 may include a hub 201 having a body or body portion 202 and a flange or flange portion 204. In the illustrated embodiment, the flange portion 204 provides threaded holes 206 which define a lug pattern designed to receive and support the wheel 102 with the use of fasteners 208.

Figure 3:
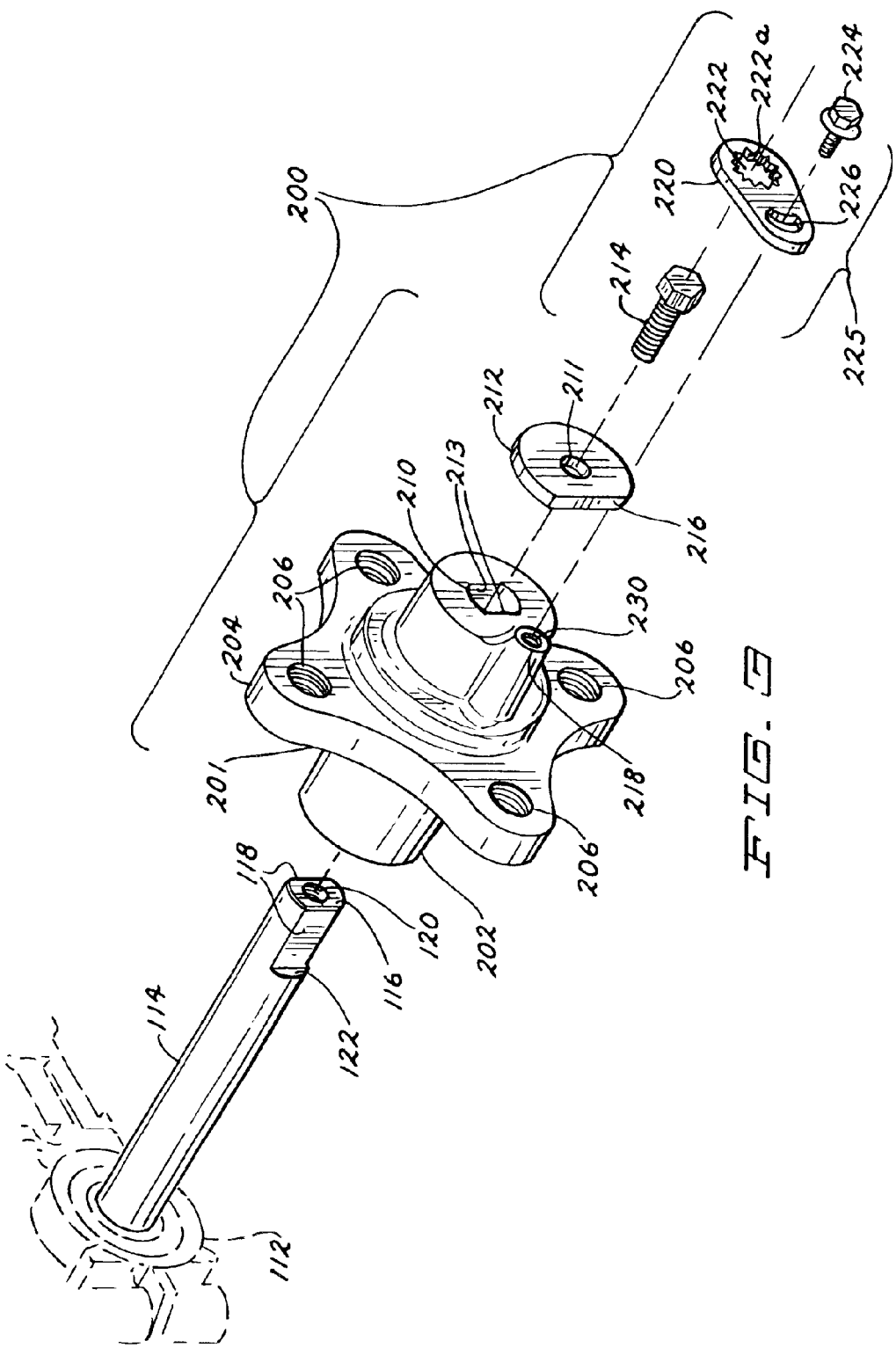
FIG. 3 is an exploded view of the wheel hub assembly of FIG. 2 illustrating with particularity an anti-rotate apparatus in accordance with one embodiment of the invention.

FIG. 3 is an exploded view of the wheel hub assembly 200 of FIGS. 1 and 2. As illustrated in this view, the distal end 116 of the axle 114 may include a coaxial threaded hole 120 to receive a hub fastener or bolt 214. One or more surfaces, e.g., flat surfaces 118, may be provided proximate the distal end 116. The flat surfaces 118 may engage corresponding drive axle receiving surfaces, e.g., diametrically opposed flat surfaces 213, formed in a central opening 210 of the hub body 202 when the hub 201 is attached to the axle 114.

To attach the hub 201 to the axle 114, a bearing member, e.g., washer 212, having a clearance hole 211 is provided. The hub fastener 214 may pass through the clearance hole 211 and thread into the threaded hole 120. While the invention is not limited to any particular component sizes, the axle 114 may be approximately 0.75 inch in diameter and the hub fastener 214 and threaded hole 120 may have a 5/16-24 UNF thread. Moreover, the distance across the flat surfaces 118 may be about 0.56 inches.

FIG. 3 further illustrates an anti-rotate apparatus 225 in accordance with one embodiment of the invention. The anti-rotate apparatus 225 may include a hub fastener anti-rotate member and a retaining fastener 224. While the anti-rotate member may take various forms, it is, in one embodiment, a generally flat and oblong-shaped lock tab 220. As further described below, the retaining fastener 224 may be threaded and secure the lock tab 220 to the hub 201 by threadably engaging an anchor or anchor portion 218. In the illustrated embodiment, the anchor 218 is integrally formed with (e.g., welded to) the hub 201. However, other embodiments may utilize different configurations, e.g., a removable anchor portion, as described below.

Figure 5:
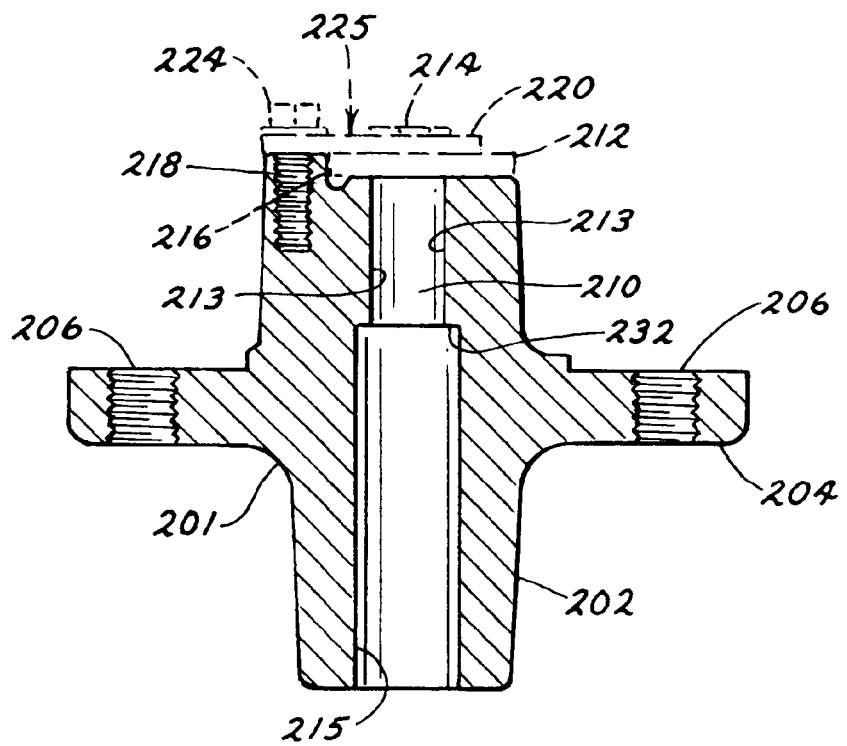
FIG. 5 is a section view of the hub portion of FIG. 4 taken along line 5—5.

The anchor 218 may include a threaded hole 230 sized to threadably receive the retaining fastener 224, which, in one embodiment, has a ¼-20 UN thread. The washer 212 may include a flat edge 216 to allow flush contact with the hub 201 without interference from the anchor 218 as shown in FIGS. 2 and 5.

The lock tab 220 may include a first opening 222 having one or more engagement portions operable to interlock and engage a head of the hub fastener 214 such that little or no relative rotation occurs between the two components. In the illustrated embodiment, the engagement portions are formed by serrations or notches 222a on an inner portion (see FIG. 7) of the first opening 222. These notches 222a are configured to engage corners of the head of the hub fastener 214.

The lock tab 220 may also include a second opening 226 through which the retaining fastener 224 may pass in order to secure the lock tab 220 to the hub 201. The second opening 226 may provide clearance for the retaining fastener 224 and may be oversized, e.g., slotted, to permit alignment and engagement of the fastener 224 with the threaded hole 230.

Figure 4:
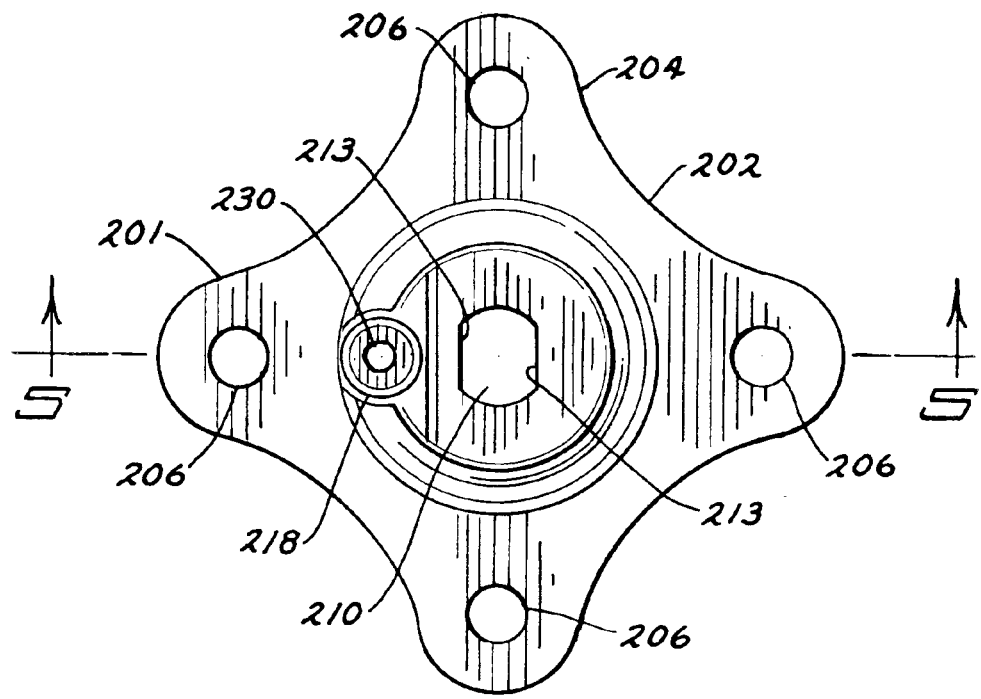
FIG. 4 is a side elevation view of a hub portion of the wheel hub assembly of FIG. 3.

FIG. 4 is an elevation view of the hub 201 clearly illustrating the body portion 202, the flange portion 204 with threaded holes 206, the anchor 218 with threaded hole 230, and the central opening 210 and the mating surfaces 213. While the mating surfaces 213 are shown as generally two diametrically opposed flats formed in the central opening 210 (sometimes referred to as a "double-D" configuration), other mating surface configurations are also possible. In fact, most any engagement surface configuration that provides for torque transfer between the axle 114 and the hub 201 is possible without departing from the scope of the invention.

FIG. 5 is a section view of the hub 201 illustrating, among others, the relative positions of the washer 212 (in phantom lines) and the anchor 218 when the hub assembly 200 is attached to the axle 114 (not shown in this view). The anti-rotate apparatus 225 and the hub fastener 214 are also illustrated in this view in phantom lines. While the flat 216 of the washer 212 is beneficial to avoid interference from the anchor 218, other embodiments could locate the anchor 218 outside the envelope of the washer 212. In such embodiments, a generally round washer 212 may be used.

FIG. 5 further illustrates the central bore 210 and the surfaces 213. Except in the vicinity of the surfaces 213, the central bore 210 may be substantially cylindrical in shape as identified by the region 215. As a result, the hub 201 may slide over the axle 114 until a face 122 (formed by the transition of the flat surfaces 118 to the round axle 114 as shown in FIG. 3) of the axle contacts a surface 232 of the hub 201.

Figure 7:
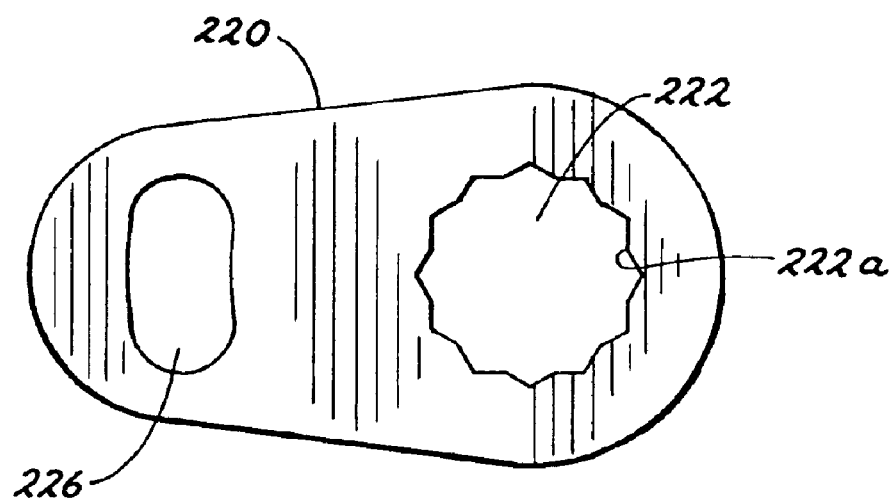
FIG. 7 is an enlarged view of an anti-rotate member, e.g., lock tab, of the anti-rotate apparatus of FIG. 3.
Figure 6:
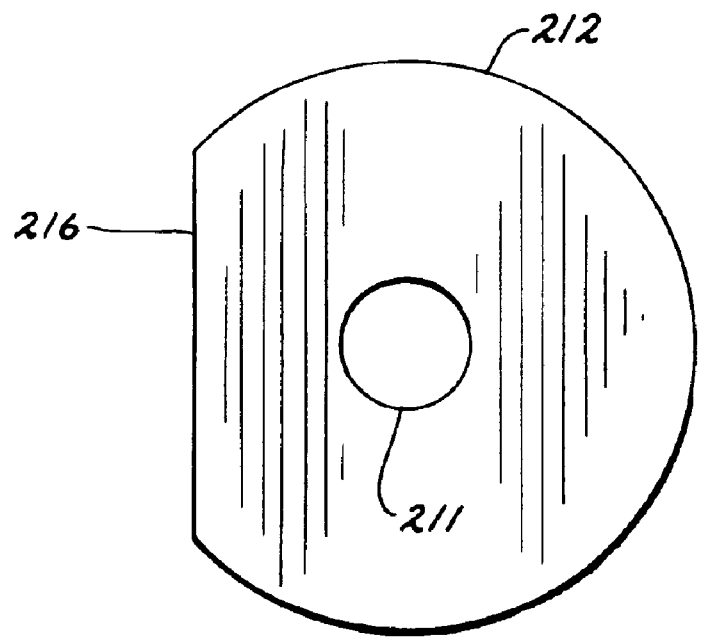
FIG. 6 is an enlarged view of a bearing member, e.g., washer, of the hub assembly of FIG. 3.

FIG. 6 is an enlarged view of the washer 212, and FIG. 7 is an enlarged view of the lock tab 220. FIG. 7 clearly illustrates the notches 222a within the first opening 222, as well as the slotted second opening 226.

To install the hub assembly 200 of FIGS. 1–3, the hub 201 is slid over the distal end 116 of the axle 114 (see FIG. 3). The hub 201 may be rotated to permit the flats 118 of the axle 114 (see FIG. 3) to engage the corresponding surfaces 213 (see FIG. 5) of the hub 201. The hub 201 may then slide axially until the face 122 (see FIG. 3) of the axle 114 contacts the surface 232 (see FIG. 5) of the hub 201. Preferably, the distal end 116 of the axle 114 remains within the central opening 210, i.e., it does not extend outside the hub 201, when the surface 232 contacts the face 122.

The washer 212 may then be located over the central opening 210 of the hub 201 adjacent the distal end 116 of the axle 114 and rotated until the flat 216 seats around the anchor 218 as illustrated in FIG. 5. The hub fastener 214 (see FIG. 3) may then be passed through the clearance hole 211 of the washer 212 and threaded into the threaded hole 120 (see also FIG. 3). After tightening the hub fastener 214 to the desired torque (which may be about 225 in-lbs for the 5/16 inch fastener) the first opening 222 of the lock tab 220 (see FIG. 7) may be placed over the head of the hub fastener 214 such that the second opening 226 aligns with the threaded hole 230 of the anchor 218. The retaining fastener 224 may then be passed through the opening 226 and threadably engaged with the threaded hole 230.

After tightening the retaining fastener 224 to the desired torque, the wheel 102 may be positioned adjacent the hub assembly 200 and the lug pattern aligned with the threaded holes 206 of the flange 204. Lug fasteners 208 (see FIG. 2) may then be passed through the wheel 102, threaded into the threaded holes 206, and torqued appropriately.

During operation, forces that would otherwise tend to loosen the hub fastener 214 are at least partially reacted by the anti-rotate apparatus 225. These forces may be caused by, for example, backlash between the hub 201 and the axle 114. Such loosening loads may also be caused or magnified by axial loading of the hub 201 against the hub fastener 214. Such axial loading may result from various operating conditions, e.g., operation of the mower 100 laterally across an inclined surface. However, with the anti-rotate apparatus 225 in place, any tendency of the hub fastener 214 to rotate relative to the hub 201 is substantially reacted by the lock tab 220, which is itself fastened to the hub 201 by the fastener 224.

FIGS. 8–12 illustrate a wheel hub assembly 300 in accordance with another embodiment of the invention. In this embodiment, a hub 301 of the hub assembly 300 is permanently attached to its wheel 303, i.e., it is not intended for subsequent removal from, after initial attachment to, the wheel 303. The hub 301 may be coupled to the wheel 303 in any number of ways including, for example, welding, threading, staking, or any other method that provides a generally fixed connection between the two components.

Like the hub 201 described above, the hub 301 includes a central opening 310 (see FIG. 8) operable to receive the axle 114 (see FIG. 1). The central opening 310 may also include surfaces, e.g., dual flat surfaces 313 (generally identical to surface 213 described above), operable to engage the axle surfaces 118 (see FIG. 1). The central opening 310 may also include a generally cylindrical portion, identified by reference numeral 315 in FIG. 9, to accommodate the cylindrical portion of the axle 114. A surface 332, formed by the transition between the cylindrical portion 315 and the surfaces 313, may assist in axially locating the hub assembly 300 relative to the axle 114.

Figure 9:
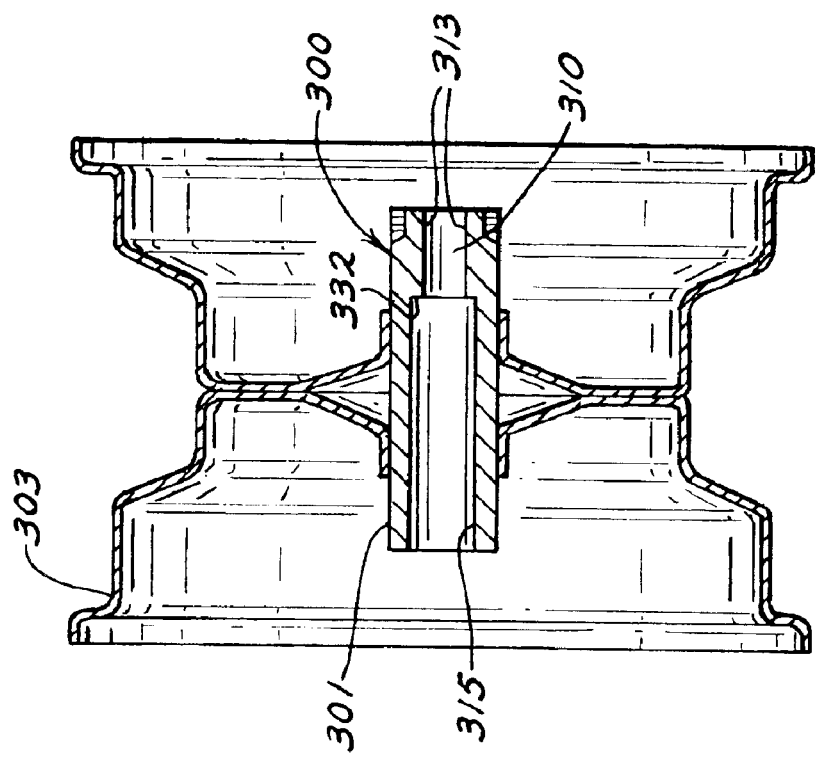
FIG. 9 is a section view of the wheel and wheel hub assembly of FIG. 8 taken along line 9—9.
Figure 8:
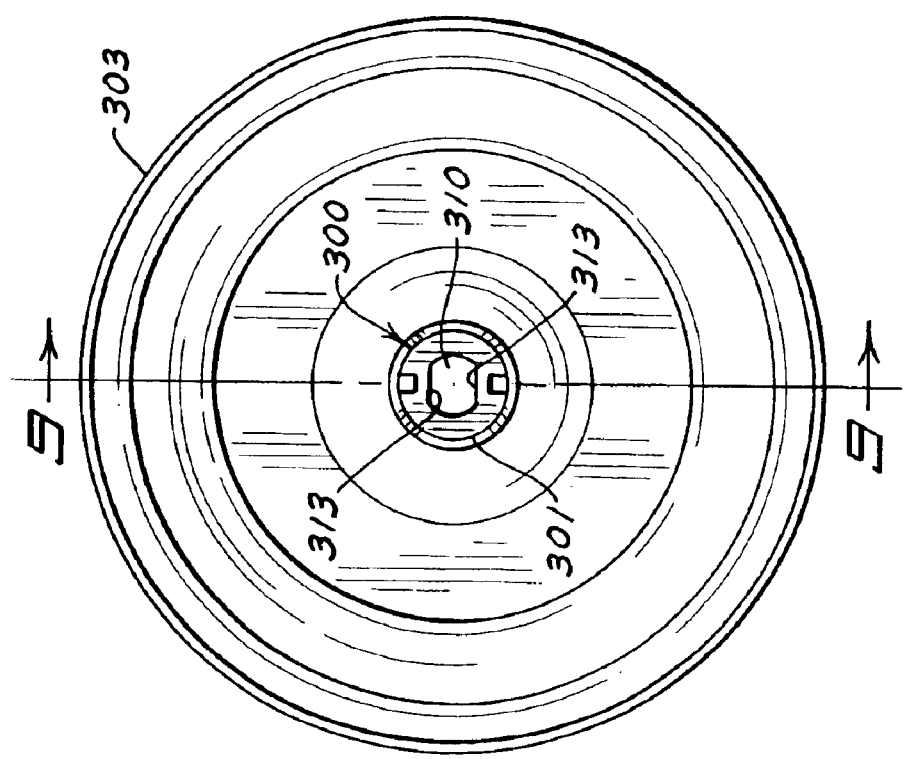
FIG. 8 is a side elevation view of a wheel and wheel hub assembly in accordance with another embodiment of the present invention.
Figure 10:
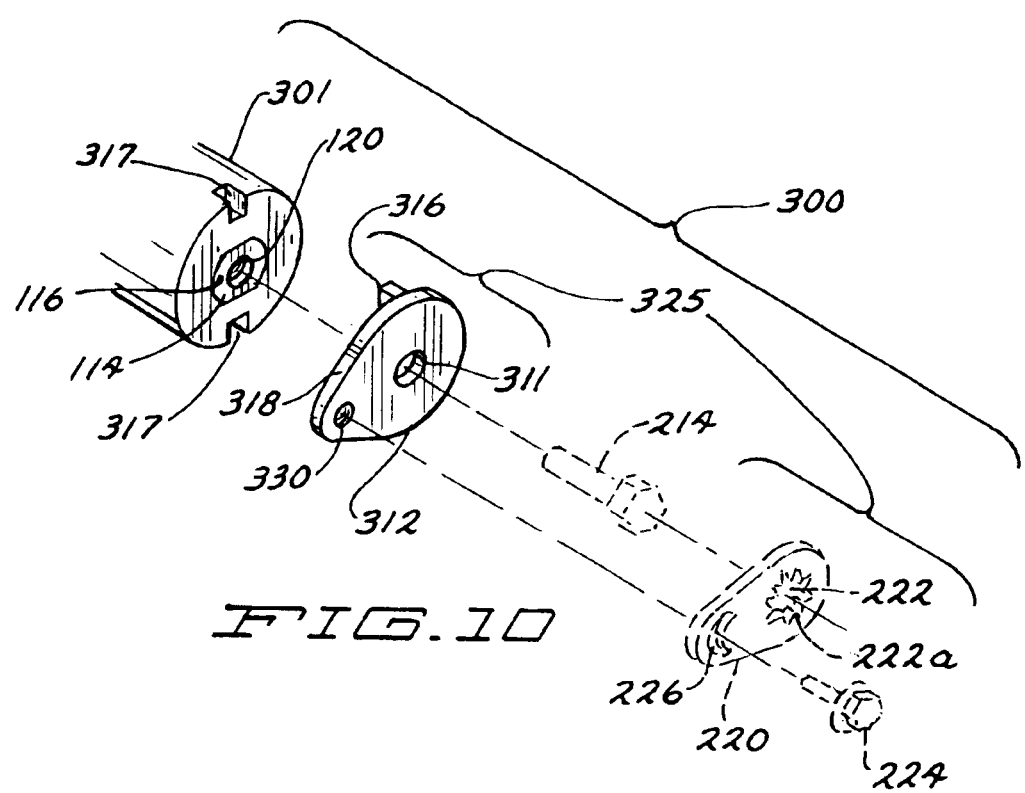
FIG. 10 is an exploded view of the wheel hub assembly of FIG. 8 illustrating an anti-rotate apparatus in accordance with another embodiment of the invention.

FIG. 10 is an exploded view the hub assembly 300 of FIGS. 8 and 9. As with the hub assembly 200 described above, the hub 301 is operable to slide over the distal end 116 of the axle 114 until the face 122 (see FIG. 3) of the axle contacts the surface 332 (see FIG. 9). Contact between the face 122 and the surface 332 preferably occurs before the distal end 116 protrudes beyond the hub 301. To secure the hub 301 axially to the axle 114, the hub assembly 300 may also include the hub fastener 214 as already described above.

The hub 301 may also include one or more first engagement portions, e.g., slots 317, the purpose of which is explained below. While various configurations are possible, the first engagement portions of the illustrated embodiment are defined by two slots 317 formed at diametrically opposed locations on an outer edge of the hub 301. However, this configuration is not limiting as any number of slots, or other engagement configurations, are possible.

The hub assembly 300 further includes an anti-rotate apparatus 325 that functions in a manner similar to the anti-rotate apparatus 225 described above. For example, the anti-rotate apparatus 325 may include an anti-rotate member, e.g., the lock tab 220. The lock tab 220 includes the first opening 222 with notches 222a (see FIG. 7) operable to engage the head of the hub fastener 214, and the second opening 226. The apparatus 325 may further include the fastener 224 operable to secure the lock tab 220, via the second opening 226, to the hub 301.

The anti-rotate apparatus 325 may further include a bearing member located between a head of the hub fastener 214 and the face of the hub 301. In the illustrated embodiment, the bearing member is configured as an oblong washer 312. The washer 312 is illustrated in detail in FIGS. 11 and 12. Like the washer 212, the washer 312 may include a clearance hole 311 to receive the hub fastener 214. However, unlike the washer 212, the washer 312 may also include an anchor portion 318 having a threaded hole 330 operable to threadably receive the retaining fastener 224. Moreover, the washer 212 may further include one or more second engagement portions, e.g., tabs 316, which are further described below.

To attach the hub assembly 300 to the axle 114, the hub 301 may be slid over the axle and rotated until the flats 118 engage the surfaces 313 as already described above. The washer 312 may then be placed over the end of the hub 301, as indicated in FIG. 10, and positioned such that the tabs 316 engage the slots 317. The hub fastener 214 may then be inserted through the opening 311 of the washer 312, threaded into the hole 120 (see FIG. 1), and tightened to the desired torque value. Once the hub fastener is tightened to the axle 114, the tabs 316 are securely retained within the slots 317. As a result, the washer 312 is substantially rotationally secured relative to the hub 301 such that it experiences little or no rotation relative to the hub 301.

The first opening 222 of the lock tab 220 may then be placed over the head of the hub fastener 214 such that the second opening 226 of the anti-rotate washer aligns with the threaded hole 330 of the anchor portion 318 of the washer 312. The retaining fastener 224 may then be passed through the second opening 226, threadably engaged with the threaded hole 330, and torqued appropriately. Thus, in a manner similar to the anti-rotate assembly 225 described above, the anti-rotate apparatus 325 provides resistance to loosening of the hub fastener 214 relative to the axle 114 during operation.

Figure 11:
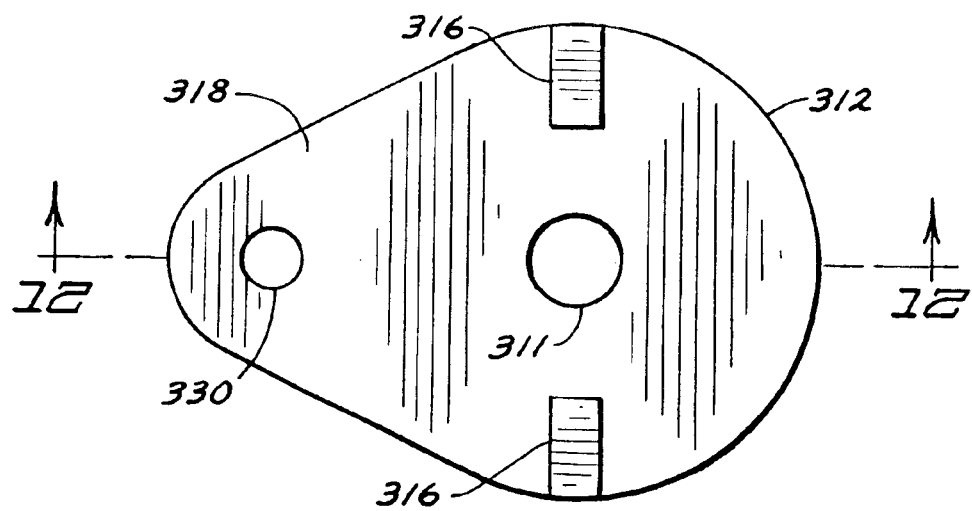
FIG. 11 is an enlarged view of a bearing member, e.g., washer, of the anti-rotate apparatus of FIG. 10.
Figure 12:
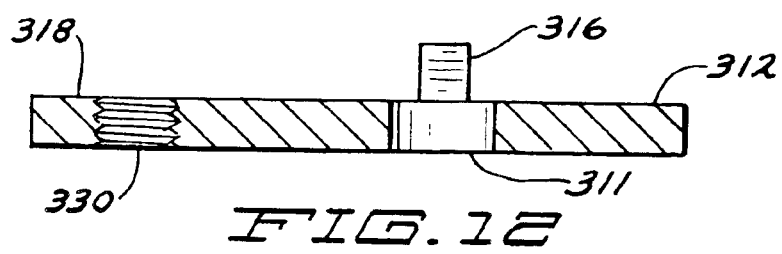
FIG. 12 is a section view of the washer of FIG. 11 taken along line 12—12.

FIGS. 11 and 12 illustrate the tabs 316. The tabs 316 may be integrally formed with or, alternatively, attached to, the washer 312 by most any process including, for example, machining or welding. Moreover, while one particular embodiment is illustrated in the figures, other engagement techniques may be utilized to rotationally secure the washer 312 relative to the hub 301. For example, the tabs 316 and slots 317 could be reversed, e.g., tabs on the hub 301 and slots on the washer 312. Alternatively, the washer 312 could attached to the hub 301 with other fasteners rather than the tabs and slots. In fact, most any technique that substantially rotationally secures the washer 312 relative to the hub 301 is possible without departing from the scope of the invention.

FIG. 13 illustrates a hub assembly 400 having an anti-rotate apparatus 425 in accordance with yet another embodiment of the invention. The hub assembly 400 may include a hub 401 similar in construction to either the hub 201 or the hub 301 already described herein. However, in this embodiment, neither the engagement portions, e.g., slots 317 (see FIG. 10), or the anchor 318 (see FIG. 3) are required.

The hub 401 preferably includes a central opening 410 to receive the distal end 116 of the axle 114 as already described herein. The hub assembly 400 may also include a bearing member, e.g., washer 412, to provide a bearing surface for the hub fastener 214. The hub 401 may be secured to the axle 114 with the washer 412 and hub fastener 214 substantially as described elsewhere herein, see e.g., description of washer 212 and fastener 214 above.

The anti-rotate apparatus 425 of FIG. 13 may include an anti-rotate member, e.g., clamp 420, and a threaded retaining fastener 424. The clamp 420 may include a first opening 442 shaped to engage the head of the hub fastener 214. The first opening 442 may be formed by, for example, broaching or machining to form a generally hexagon-shaped opening as shown in FIGS. 13 and 14. The clamp 420 may also include a second opening 440 operable to receive the retaining fastener 424. In one embodiment, the length of the retaining fastener 424 is selected such that it protrudes from the opposite side of the clamp 420 a sufficient distance to permit it to threadably engage a nut 426. Alternatively, the second hole 420 may, on the opposite side of the clamp 420, have a thread formed therein for receiving the retaining fastener 424, in which case the nut 426 would not be required.

A longitudinal slot 444 extends from the first opening 442 radially outward as shown in FIG. 14, thereby separating portions 420a and 420b of the clamp 420. As further described below, the slot 444 permits deflection, e.g., clamping, of the clamp 420 when the retaining fastener 424 is tightened. That is, the longitudinal slot 444 permits the portions 420a and 420b to move towards one another, e.g., deflect, when the retaining fastener 424 is tightened. As the portions 420a and 420b move toward one another, the size of the first opening 442 is reduced. The clamp 420 may be made of most any material that allows sufficient deflection without failure. For example, in one embodiment, the clamp 420 is made of aluminum.

FIG. 15 illustrates a section view of the anti-rotate member 420 taken along line 15—15 of FIG. 14. As this view illustrates, the first opening 442 transitions to a generally cylindrical surface 446 of a diameter that permits receipt of the external diameter of the hub 401 with a slight clearance fit. The transition preferably forms a surface 448 that may abut a face 449 (see FIG. 13) of the hub 401 when the clamp 420 is attached.

The clamp 420 may include other features. For example, cutouts 450 may be provided on each portion 420a, 420b. The cutouts 450 may be provided for any number of reasons, e.g., manufacturing or engineering requirements, aesthetics, etc.

To install the hub assembly 400, the hub 401 may be slid over the axle 114 as already described herein. The washer 412 may be positioned over the end of the hub 401, after which the hub fastener 214 may be threaded into the axle 114 and tightened to the appropriate torque level. The clamp 420 may then be slid over the external diameter of the hub 401 and rotated until the head of the hub fastener 214 seats within the first opening 442 of the clamp 420 and the surface 448 of the clamp contacts the face 449 of the hub 401. The retaining fastener 424 may then be inserted into the second opening 440 and tightened. As the retaining fastener 424 is tightened, the portions 420a and 420b (see FIG. 14) move towards one another, i.e., the longitudinal slot 444 narrows. As this happens, the clamp 420 tightens around both the hub fastener 214 and the outer diameter of the hub 401. Thus, the anti-rotate apparatus 420 may substantially limit or prevent relative rotation between the fastener 214 and the hub 401.

Hub assemblies in accordance the present invention are thus able to provide an economical and reliable method of securely fastening a wheel hub to a drive axle of a ZRT vehicle. Moreover, by incorporating anti-rotate apparatus as described herein, hub assemblies of the present invention substantially reduce or eliminate relative rotation between a coaxial hub fastener and the wheel hub. In addition, hub assemblies having anti-rotate apparatus in accordance with the present invention may utilize simple hub/axle mating surfaces, e.g., opposing flats, as opposed to more complex surfaces such as keyways and tapers. Still further, anti-rotate apparatus described herein are reusable. That is, they may be easily removed and reinstalled as necessary, e.g., for wheel maintenance.

Exemplary embodiments of the present invention are described above. Those skilled in the art will recognize that many embodiments are possible within the scope of the invention. Other variations, modifications, and combinations of the various parts and assemblies can certainly be made and still fall within the scope of the invention. Thus, the invention is limited only by the following claims, and equivalents thereto.

What is claimed is:

1. A wheel hub assembly for attachment to a drive axle of a zero-radius-turning mower, the hub assembly comprising:

a hub defining a central opening with one or more drive axle receiving surfaces, the hub comprising a threaded anchor portion proximate the central opening;

a hub fastener operable to axially secure the hub to the drive axle;

a bearing member positionable between a head of the hub fastener and the hub, the bearing member comprising a peripheral edge having a shape that generally conforms to a shape of the threaded anchor portion; and an anti-rotate apparatus comprising: an anti-rotate member to selectively and interlockably engage the head of the hub fastener; and at least one threaded retaining fastener to engage the threaded anchor portion of the hub and secure the anti-rotate member relative thereto.

2. The hub assembly of claim 1, wherein the one or more drive axle receiving surfaces comprises two diametrically opposed and parallel flat surfaces.

3. The hub assembly of claim 1, wherein the anti-rotate member defines a first opening and a second opening, wherein the first opening may interlockably engage the hub fastener, and the second opening may receive the at least one threaded retaining fastener.

4. The hub assembly of claim 3, the first opening comprises one or more notches operable to engage the head of the hub fastener.

5. The hub assembly of claim 3, wherein the second opening defines a slot.

6. The hub assembly of claim 1, wherein the anti-rotate apparatus substantially restricts or prevents rotation of the hub fastener relative to the hub when the hub is attached to the drive axle.

7. A wheel hub assembly for coupling a wheel to a drive axle of a zero-radius-turning vehicle, the hub assembly comprising:

a hub defining a central opening having parallel, opposing drive axle receiving surfaces;

a hub fastener coaxial with an axis of the drive axle, the hub fastener operable to axially retain the hub relative to the drive axle;

a bearing member positionable between a head of the hub fastener and the hub, the bearing member comprising a peripheral edge defining at least one flat to seat against a threaded anchor portion protruding from a face of the hub; and an anti-rotate apparatus comprising an anti-rotate member and at least one threaded retaining fastener, the anti-rotate apparatus to substantially limit or prevent relative rotation between the hub fastener and the hub when the hub is attached to the drive axle.

8. The hub assembly of claim 7, wherein the anti-rotate member comprises a generally flat lock tab, the lock tab having a first opening operable to engage the hub fastener and a second opening operable to receive the at least one threaded retaining fastener.

9. The hub assembly of claim 7, wherein the at least one threaded retaining fastener threadably engages the threaded anchor portion of the hub.

* * * * *